US012020209B2

(12) United States Patent
Raghunath et al.

(10) Patent No.: US 12,020,209 B2
(45) Date of Patent: Jun. 25, 2024

(54) DIGITAL ASSET AND DESIGN COMPONENT TRACKING IN A COLLABORATIVE ENVIRONMENT

(71) Applicant: ADOBE INC., San Jose, CA (US)

(72) Inventors: Lavanya Raghunath, San Jose, CA (US); Gavin Murray Peacock, Walnut Creek, CA (US); Michael James Andrew Smith, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 767 days.

(21) Appl. No.: 14/726,334

(22) Filed: May 29, 2015

(65) Prior Publication Data

US 2016/0350716 A1     Dec. 1, 2016

(51) Int. Cl.
| | | |
|---|---|---|
| G06F 40/117 | (2020.01) | |
| G06F 3/04842 | (2022.01) | |
| G06F 40/186 | (2020.01) | |
| G06F 40/197 | (2020.01) | |
| G06Q 10/10 | (2023.01) | |

(52) U.S. Cl.
CPC ....... *G06Q 10/103* (2013.01); *G06F 3/04842* (2013.01); *G06F 40/117* (2020.01); *G06F 40/186* (2020.01); *G06F 40/197* (2020.01)

(58) Field of Classification Search
CPC . G06Q 10/103; G06F 3/0486; G06F 3/04842; G06F 17/30; G06F 16/00
USPC ........................................................ 707/710
See application file for complete search history.

(56) References Cited

U.S. PATENT DOCUMENTS

| | | | | |
|---|---|---|---|---|
| 6,560,639 | B1* | 5/2003 | Dan ...................... | G06F 16/958 |
| | | | | 707/999.102 |
| 7,890,919 | B1* | 2/2011 | Williams .................. | G06F 8/36 |
| | | | | 717/113 |
| 7,930,273 | B1* | 4/2011 | Clark ........................ | G06F 8/71 |
| | | | | 717/170 |
| 10,365,919 | B1* | 7/2019 | Mandrika ................. | G06F 8/71 |
| 2013/0179761 | A1* | 7/2013 | Cho ....................... | G06F 40/186 |
| | | | | 715/202 |

(Continued)

*Primary Examiner* — Hosain T Alam
*Assistant Examiner* — Tracy M McGhee
(74) *Attorney, Agent, or Firm* — Shook, Hardy & Bacon L.L.P.

(57) ABSTRACT

As digital assets are created and shared, design components that comprise those digital assets are curated, organized, and tracked so as to allow meaningful relationships to be established between shared assets and design components. The tracking that underlies such relationships is provided by metadata associated with a given design component. This metadata may include information such as an asset identifier that identifies a source digital asset from which the design component was extracted; a version identifier that identifies a version of the source digital asset; an author identifier that identifies an author of the source digital asset; and a layer identifier that can be used to reveal the context in which the design component was derived from the source asset. This metadata allows relationships to be established between a design component and the digital assets that incorporate that design component, thus facilitating asset and component tracking and update notification broadcasting.

20 Claims, 8 Drawing Sheets

(56) References Cited

U.S. PATENT DOCUMENTS

2013/0198156 A1\* 8/2013 Penikis .................. G06F 16/44
715/764
2016/0350716 A1\* 12/2016 Raghunath ............ G06F 40/186

\* cited by examiner

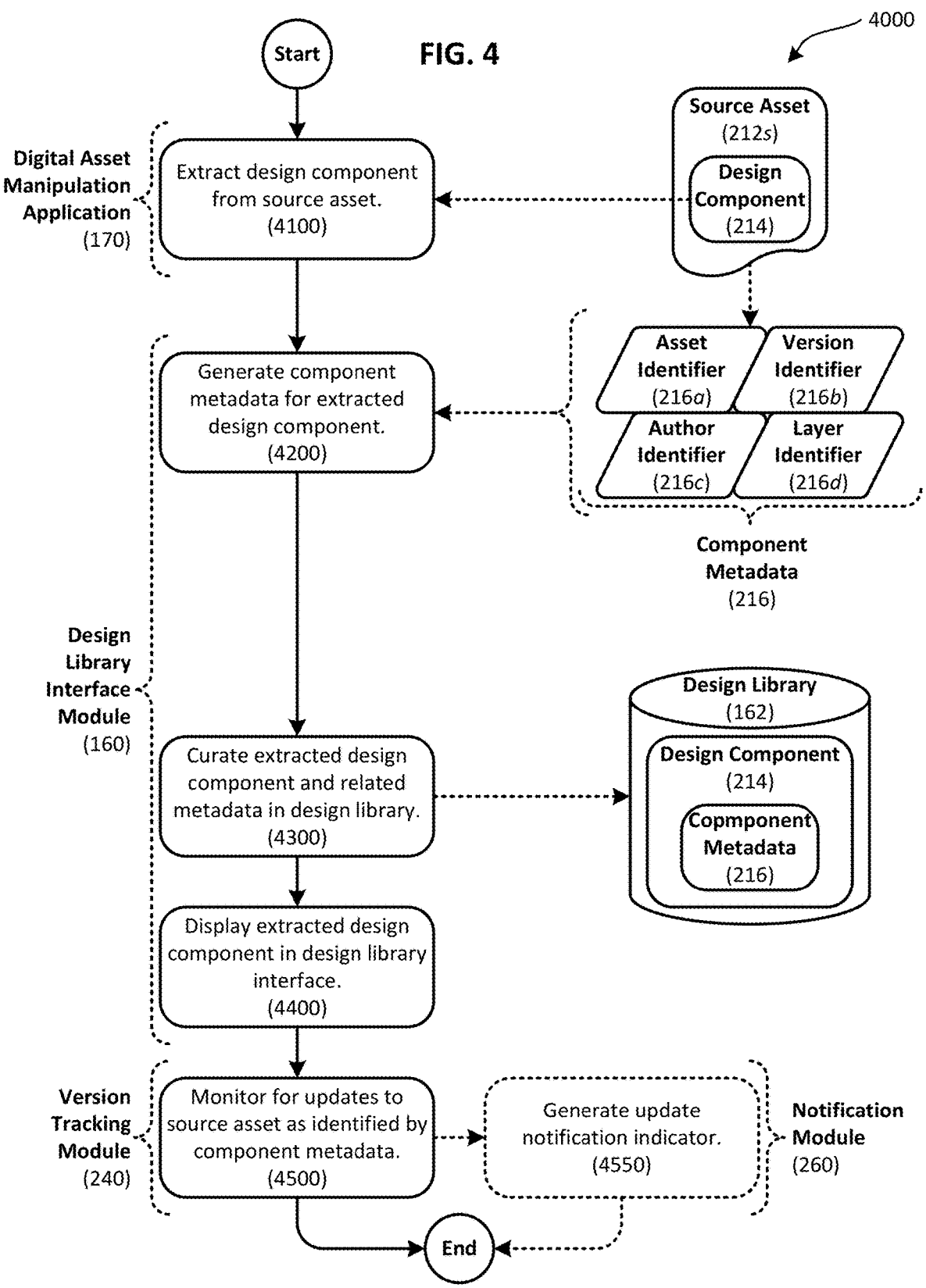

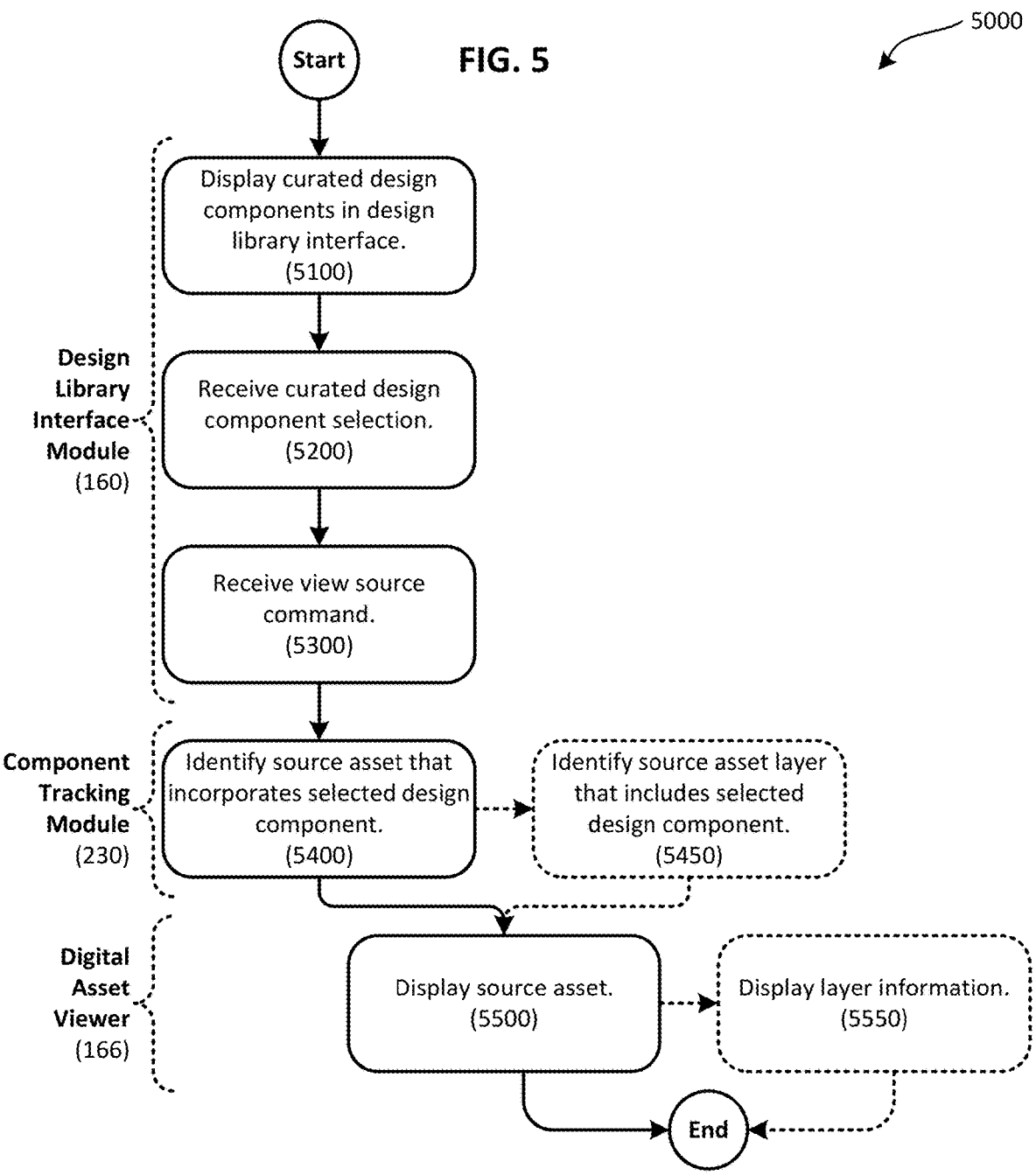

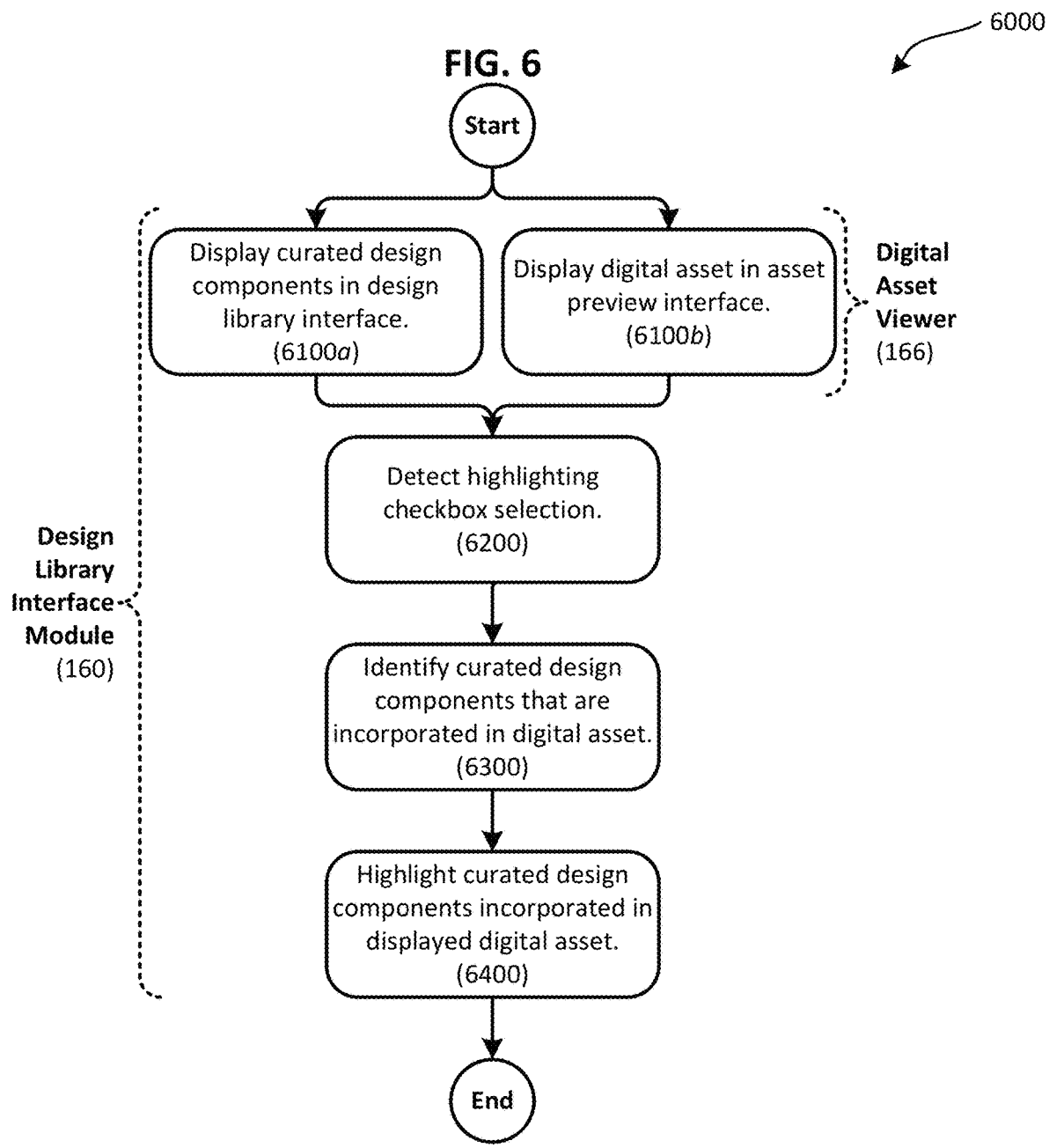

DIGITAL ASSET AND DESIGN COMPONENT TRACKING IN A COLLABORATIVE ENVIRONMENT

FIELD OF THE INVENTION

This disclosure relates generally to management of digital assets, and more specifically to digital asset and design component tracking in a collaborative environment.

BACKGROUND

Sharing and collaboration are increasingly important aspects of the workflows that designers use to create, manipulate, and manage digital assets. Indeed, designers often create new assets using design components that are extracted from existing assets. For example, when authoring web content or creating a user interface, a designer may use design components such as fonts, graphical elements, color schemes, and icons that have already been used in existing assets. This not only makes the design process more efficient by reducing duplicative effort, but it also allows a team of designers to collaboratively produce a common "look-and-feel" across an entire website or application interface. Leveraging a familiar set of user interface elements also tends to make software applications more straightforward and intuitive for end users who recognize such elements as having a common significance or function. Collaborative workflows in the digital design field are supported by software tools that allow a team of users to share digital assets and communicate about a design project. Examples of existing tools that are often used for sharing digital assets include Google Drive (Google Inc., Mountain View, Calif.) and Dropbox (Dropbox, Inc., San Francisco, Calif.). In some cases a suite of software applications that are frequently used by a team of designers will include integrated access to cloud-based storage resources that provide a shared asset repository that can be accessed by the design team. One example of such a software suite is Adobe Creative Cloud (Adobe Systems Incorporated, San Jose, Calif.).

BRIEF DESCRIPTION OF THE DRAWINGS

FIG. 4 is a flowchart illustrating an example method for curating design components in a design library.

FIG. 5 is a flowchart illustrating an example method for viewing digital assets that incorporate a selected design component.

FIG. 6 is a flowchart illustrating an example method for identifying design components that form part of a displayed digital asset.

DETAILED DESCRIPTION

Figure 1A:
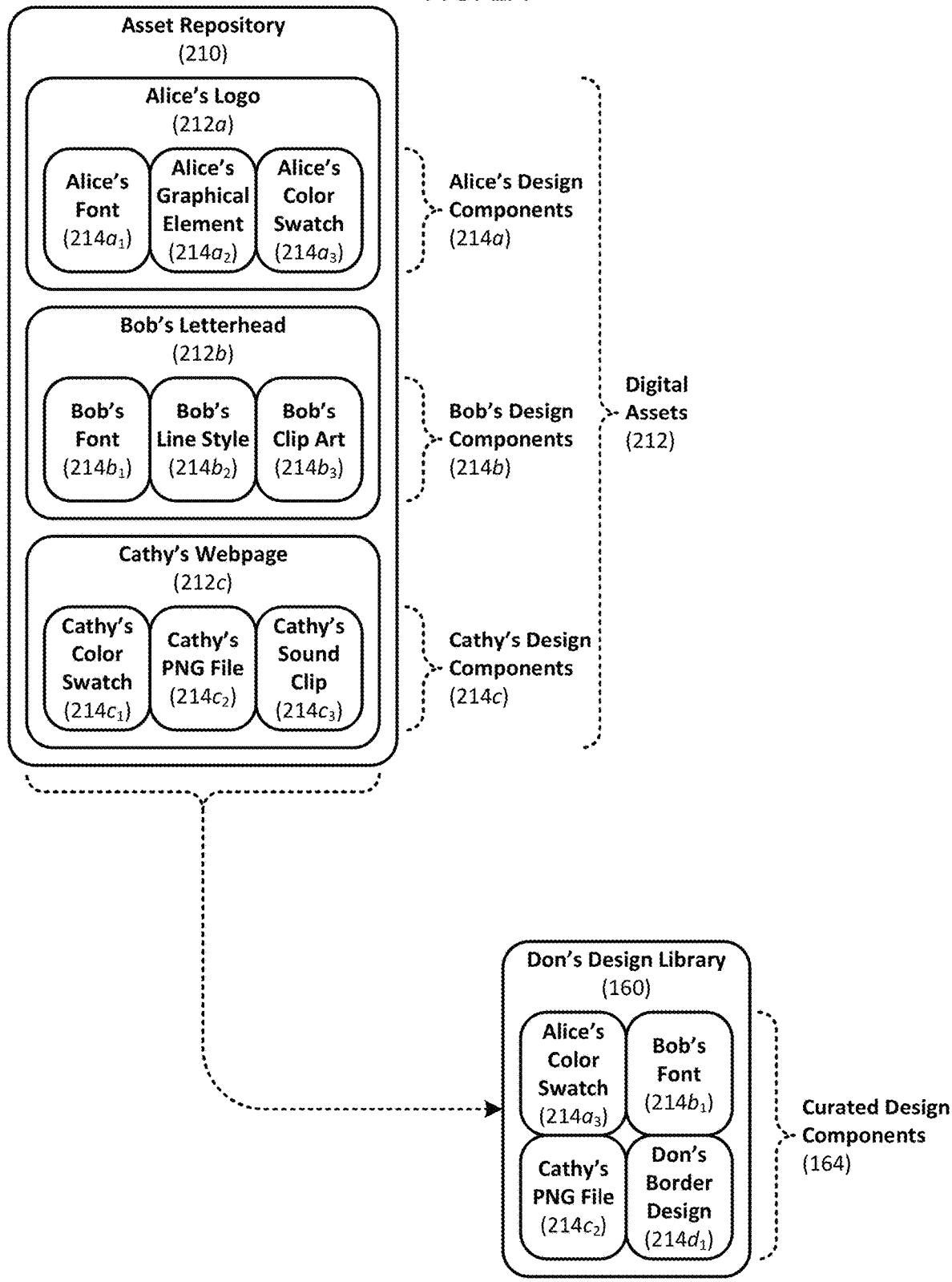
FIG. 1A is a block diagram schematically illustrating an example asset repository that includes a plurality of digital assets, each of which in turn includes a plurality of design components, wherein selected design components have been curated into a design library.

Existing collaborative resources, including cloud-based shared storage repositories, allow multiple users to access a shared collection of digital assets. While such resources facilitate asset distribution amongst a team of collaborators in a general sense, they lack the ability to track the individual design components that often comprise the shared assets. As a result, if a particular design component is updated, existing resources are not well-suited for communicating that update to team members working with assets that may incorporate an older version of the updated component. This makes it difficult to track where certain design components are deployed, and more generally, to share design components across multiple projects with consistency. It also makes it difficult to track derived assets. For example, a designer may create a typeface that is shared amongst a design team, but he/she may later modify the typeface in accordance with a corporate rebranding effort. Existing resources do not provide an easy way for the designer to (a) discover what assets have incorporated the typeface, and (b) notify the owners of those assets that the typeface has been updated. This makes it difficult to propagate the designer's modifications to other assets that use the typeface. The fact that existing collaborative resources facilitate asset distribution without providing the ability to reliably manage or track how the distributed assets are used actually exacerbates the shortcomings associated with existing solutions. These shortcomings represent substantial impediments to the efficient organization of collaborative workflows.

Thus, and in accordance with certain of the embodiments disclosed herein, techniques are provided for digital asset and design component tracking in a collaborative environment. In particular, as digital assets are created and shared, the design components that comprise those digital assets can be curated, organized, and tracked in a way that allows meaningful relationships to be established between shared assets and design components. For example, if a webpage uses a particular typeface, the webpage and the typeface are considered to be related, such that if the typeface is later modified, the webpage author can be notified of such modification. In certain implementations, the tracking that underlies such relationships is provided by metadata that is associated with a given design component. This metadata may include information such as an asset identifier that identifies a source digital asset from which the design component was extracted; a version identifier that identifies a version of the source digital asset; an author identifier that identifies an author of the source digital asset; and a layer identifier that can be used to reveal the context in which the design component was derived from the source asset. This metadata allows relationships to be established between a design component and the digital assets that incorporate that design component, thus facilitating asset and component tracking, update notification broadcasting, and other functionalities that make collaboration more efficient. As another example, when a user extracts a design component from a source digital asset and uses that design component to create a new digital asset, the metadata identifying the source digital asset is propagated forward so as to establish a link between the source asset and the newly generated asset. Numerous configurations and variations of such embodiments will be apparent in light of this disclosure.

Figure 1B:
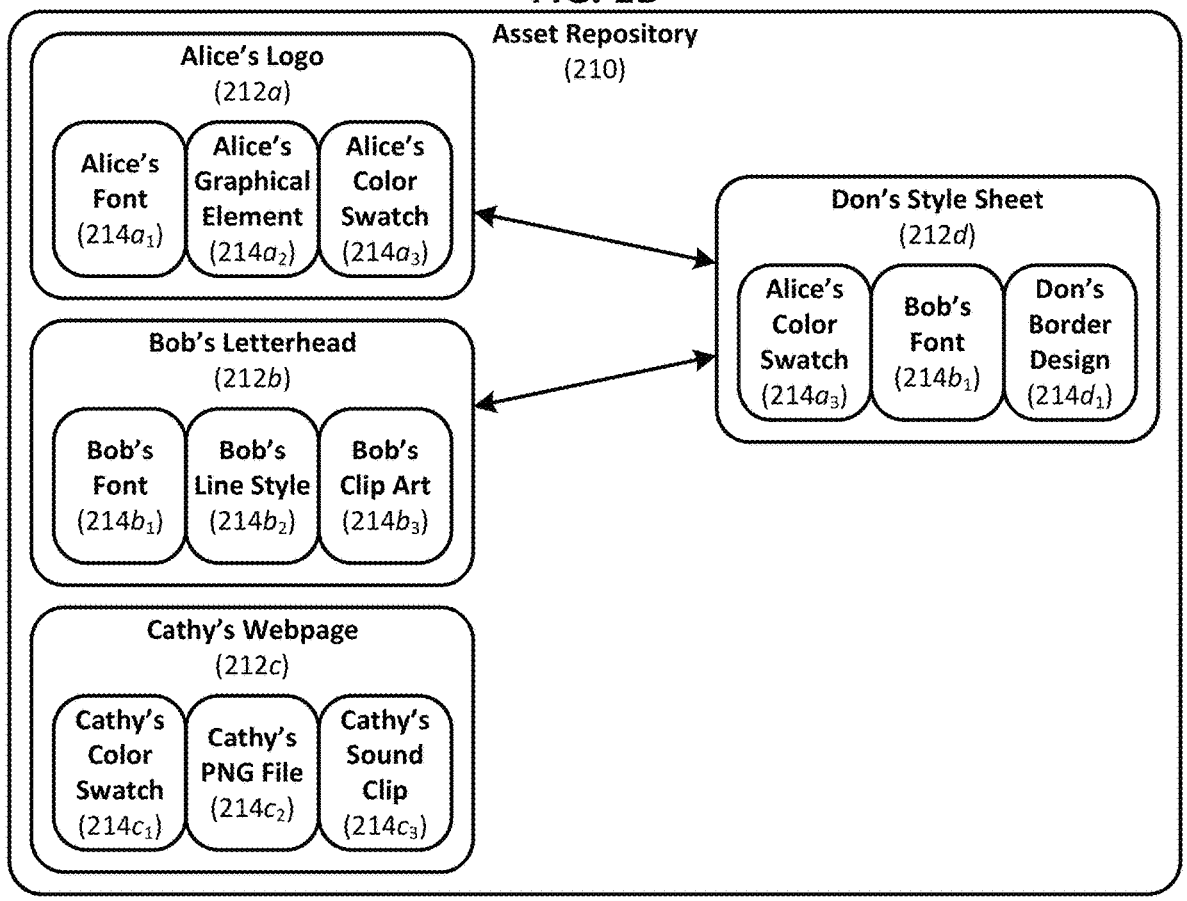
FIG. 1B is a block diagram schematically illustrating the example asset repository of FIG. 1A, wherein a new digital asset has been generated using design components extracted from existing digital assets, and wherein the new digital asset is linked to other digital assets sharing common design components.

An example implementation of certain of the embodiments disclosed herein can be better understood with reference to FIGS. 1A and 1B. FIG. 1A is a block diagram schematically illustrating an asset repository 210 that includes a plurality of digital assets 212, including a logo 212a that Alice created, a letterhead 212b that Bob created, and a webpage 212c that Cathy created. Each of digital assets 212 further comprises one or more design components. For example, Alice's logo 212a comprises a plurality of design components 214a that include a font $214a_1$, a graphical element $214a_2$, and a color swatch $214a_3$. Bob's letterhead 212b comprises a plurality of design components 214b that include a font $214b_1$, a line style $214b_2$, and a clip art $214b_3$. And Cathy's webpage 212c comprises a plurality of design components 214c that include a color swatch $214c_1$, a portable network graphics (PNG) file $214c_2$, and a sound clip $214c_3$. A fourth user, Don, may curate selected design components into a design library 160. For example, FIG. 1A illustrates that Don's collection of curated design components 164 include Alice's color swatch $214a_3$, Bob's font $214b_1$, and Cathy's PNG file $214c_2$. Don may also create his own design components, such as a border design $214d_1$, which can be included in curated design components 164.

Don may later create a new digital asset using curated design components 164. For example, FIG. 1B is a block diagram schematically illustrating asset repository 210, wherein a new digital asset (Don's style sheet 212d) has been generated using design components extracted from the existing digital assets 212. As a result, Don's new style sheet 212d is linked to the existing digital assets that share common design components (specifically, Alice's logo 212a by virtue of shared color swatch $214a_3$, and Bob's letterhead 212b by virtue of shared font $214b_1$). This linking is made possible by incorporating into the extracted design component metadata that characterizes the source digital asset from which the design component was extracted. When the extracted design component is later incorporated into a new digital asset (such as when Bob's font $214b_1$ is incorporated into Don's new style sheet 212d), the new digital asset will thus be linked with the source digital asset (such as when Don's style sheet 212d is linked with Bob's letterhead 212b). This allows Bob to understand how others in a collaborative environment have used his font. It also allows Don to be informed of possible updates to Bob's font. Such linking can be extended beyond the example illustrated in FIG. 1B, for example as would be the case if Bob's font $214b_1$ were to be extracted from Don's style sheet 212d and incorporated into yet another digital asset.

Using metadata to establish meaningful relationships between shared assets provides a wide range of benefits that addresses many of the shortcomings of existing collaborative resources and shared storage services. For example, these relationships can be used to track a particular design component from its source to its various deployment points in one or more digital assets. This can be particularly useful where the author of a digital asset wishes to broadcast an update or audit how design components that he/she has created are being used. In some applications design workflows can be streamlined by propagating updates automatically based on such relationships. The tracked relationships disclosed herein can also be used to enforce copyright and/or trademark rights, monetize asset usage, generate audit data, and provide recommendations for inspirational content based on design component usage patterns. This is intelligence that does not explicitly exist as tags or labels, but rather is produced based on how assets were derived from other assets. Being able to identify the author of a particular design component also makes it easier to accurately attribute authorship credit and identify the party responsible for a particular aspect of a larger project. The metadata optionally includes a layer identifier that can be used to identify the layer from which the component was derived, thus making it easier for users to visualize, understand, and respond to the modification. In one implementation the metadata is layer-specific metadata that complies with the Extensible Metadata Platform (XMP) standard.

Certain embodiments can be understood providing a way to create, maintain, and leverage relationships between assets stored in a collaborative workspace. Such relationships are defined by metadata that can be understood as propagating downwards from a composite source asset to an element which is extracted from the composite asset. Thus, for example, if a layer is extracted from an image file, the extracted layer includes metadata that identifies the image file from which it originated. The source information can thus be propagated into new composite assets that use the extracted layer. In a general sense, this creates a record of not only how the new composite assets were created (for example, by a particular user, or using a particular tool), but also of the context in which the extracted component was obtained.

As used herein, the term "asset" refers, in addition to its ordinary meaning, to information capable of being directly or indirectly consumed by a user. For example, the term asset encompasses information directly consumed by a user such as when it is displayed on a display device, rendered using a browser, or printed on a piece of paper. The term asset further includes information that is not specifically intended for direct consumption and/or display, and therefore also encompasses items such as software, executable instructions, scripts, hyperlinks, addresses, pointers, metadata, formatting information, graphical elements, typefaces, color schemes, multimedia objects, style sheets, webpages, templates, and the like. The use of the term asset is independent of (a) how the asset is presented to the user for consumption, and (b) the software application used to create or render the asset. Assets may be encoded using one or more compression algorithms intended to reduce the amount of bandwidth required for transmission of the asset via a network. The term "digital asset" refers to an asset which is encoded in binary digits (for example, zeroes and ones), and therefore the terms "asset" and "digital asset" are often used interchangeably in the context of applications involving digital computers.

In some cases multiple assets can be combined, aggregated, or otherwise put together in a way that creates yet another asset. For example, digital assets such as typefaces, color schemes, icons, and graphical elements can be combined to create another asset such as a webpage. In this context, the component assets that are combined together may be referred to as "design components". In particular, the term "design component" refers, in addition to its ordinary meaning, to a digital asset that forms part of another digital asset. In certain of the disclosed embodiments a design component can be extracted from a first digital asset and can be used to create or supplement a second digital asset. In such cases the design component can be associated with metadata that characterizes the first digital asset, thus establishing a link between the two assets. The terms "digital asset" and "design components" can therefore be understood as establishing a hierarchical relationship. The terms "design component" and "component" may be used interchangeably.

System Architecture

Figure 2:
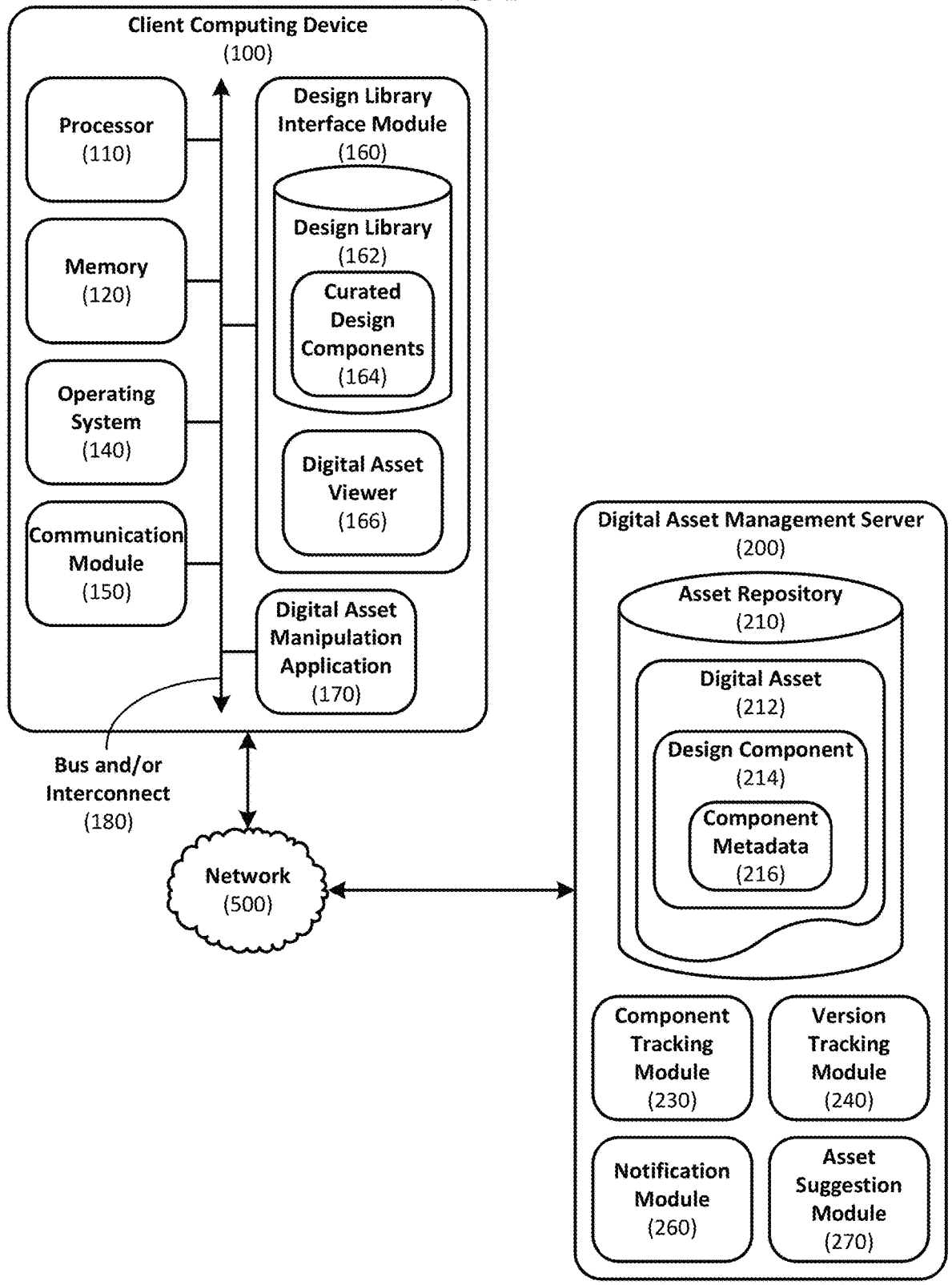
FIG. 2 is a block diagram schematically illustrating selected components of an example networked computer system that provides digital asset and design component tracking in a collaborative environment.

FIG. 2 is a block diagram schematically illustrating selected components of an example networked computer system 2000 that provides digital asset and design component tracking in a collaborative environment. Such embodiments can be understood as involving a series of interactions between a client computing device 100 and a digital asset management server 200. These interactions may occur via a network 500. While one client computing device 100 and one digital asset management server 200 are illustrated in FIG. 2, it will be appreciated that other embodiments may include any suitable number of such devices. The architecture and functionality of the various components and subcomponents comprising networked computer system 2000 will be described in turn. However, because the particular functionality provided in a given implementation may be specifically tailored to the demands of a particular application, this disclosure is not intended to be limited to provision or exclusion of any particular resources, components, or functionality.

Client computing device 100 may comprise, for example, one or more devices selected from a desktop computer, a laptop computer, a workstation, a tablet computer, a smartphone, a handheld computer, a set-top box, an enterprise-class server, or any other such computing device. A combination of different devices may be used in certain embodiments. In the illustrated embodiment, client computing device 100 includes, among other things, a processor 110, a memory 120, an operating system 140, a communication module 150, a design library interface module 160, and a digital asset manipulation application 170. As can be further seen, a bus and/or interconnect 180 is also provided to allow for inter- and intra-device communications using, for example, communication module 150. Depending on the particular type of device used for implementation, client computing device 100 is optionally coupled to or otherwise implemented in conjunction with one or more peripheral hardware components, examples of which include a display, a textual input device (such as a keyboard), and a pointer-based input device (such as a mouse). One or more other input/output devices, such as a touch sensitive display, a speaker, a printer, or a microphone, can be used in other embodiments. For example, in a particular alternative embodiment wherein client computing device 100 is implemented in the form of a tablet computer, functionality associated with the particular peripheral hardware components may be provided by a touch sensitive surface that forms part of the tablet computer. Other components and functionality not reflected in the schematic block diagram of FIG. 2 will be apparent in light of this disclosure, and thus it will be appreciated that other embodiments are not limited to any particular hardware configuration.

Processor 110 can be any suitable processor, and may include one or more coprocessors or controllers, such as an audio processor or a graphics processing unit, to assist in processing operations of client computing device 100. Memory 120 can be implemented using any suitable type of digital storage, such as one or more of a disk drive, a universal serial bus drive, flash memory, and/or random access memory. Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with client computing device 100, and therefore may also be implemented using any suitable existing or subsequently developed platform. Communication module 150 can be any appropriate network chip or chipset that allows for wired and/or wireless communication via network 500 to external components such as digital asset management server 200.

In certain embodiments design library interface module 160 provides a user interface that allows users to, among other things, access, organize, display, and otherwise interact with design components that have been curated by a user of client computing device 100. As used herein, the term "curated" refers, in addition to its ordinary meaning, to collecting, indicating, selecting, or otherwise designating certain design components as being of particular interest. For example, in one implementation design components can be curated on the basis of having been recently used and/or accessed by a user of client computing device 100. Such curation can be performed automatically or with minimal user action. In general, design library interface module 160 can be understood as allowing a subset of curated design components to be organized and displayed in a way that makes sense to a particular user or user group. In the example embodiment illustrated in FIG. 2, a collection of curated design components 164 can be organized in a design library 162 that is accessible via an interface provided by design library interface module 160. Each of the curated design components 164 optionally includes metadata characterizing various aspects of the design components stored in design library 162, such as source asset identifying information, version identifying information, author identifying information, and layer identifying information. Design library interface module 160 is optionally capable of displaying supplemental information about curated design components 164, such as notifications about components that may have become outdated, as will be described in turn. Design library interface module 160 also optionally includes a digital asset viewer 166 capable of displaying and providing information about a digital asset that incorporates one or more curated design components 164. In certain embodiments design library interface module 160 forms a part of another application, such as digital asset manipulation application 170 or a networked file explorer, while in alternative embodiments design library interface module 160 comprises a standalone application.

While design library 162 is illustrated in FIG. 2 as residing locally at client computing device 100, it will be appreciated that in other embodiments design library 162 is hosted elsewhere, such as at digital asset management server 200, or alternatively, at another networked storage location. For example, in one implementation design library 162 contains links to design components stored at a networked storage location.

Figure 3A:
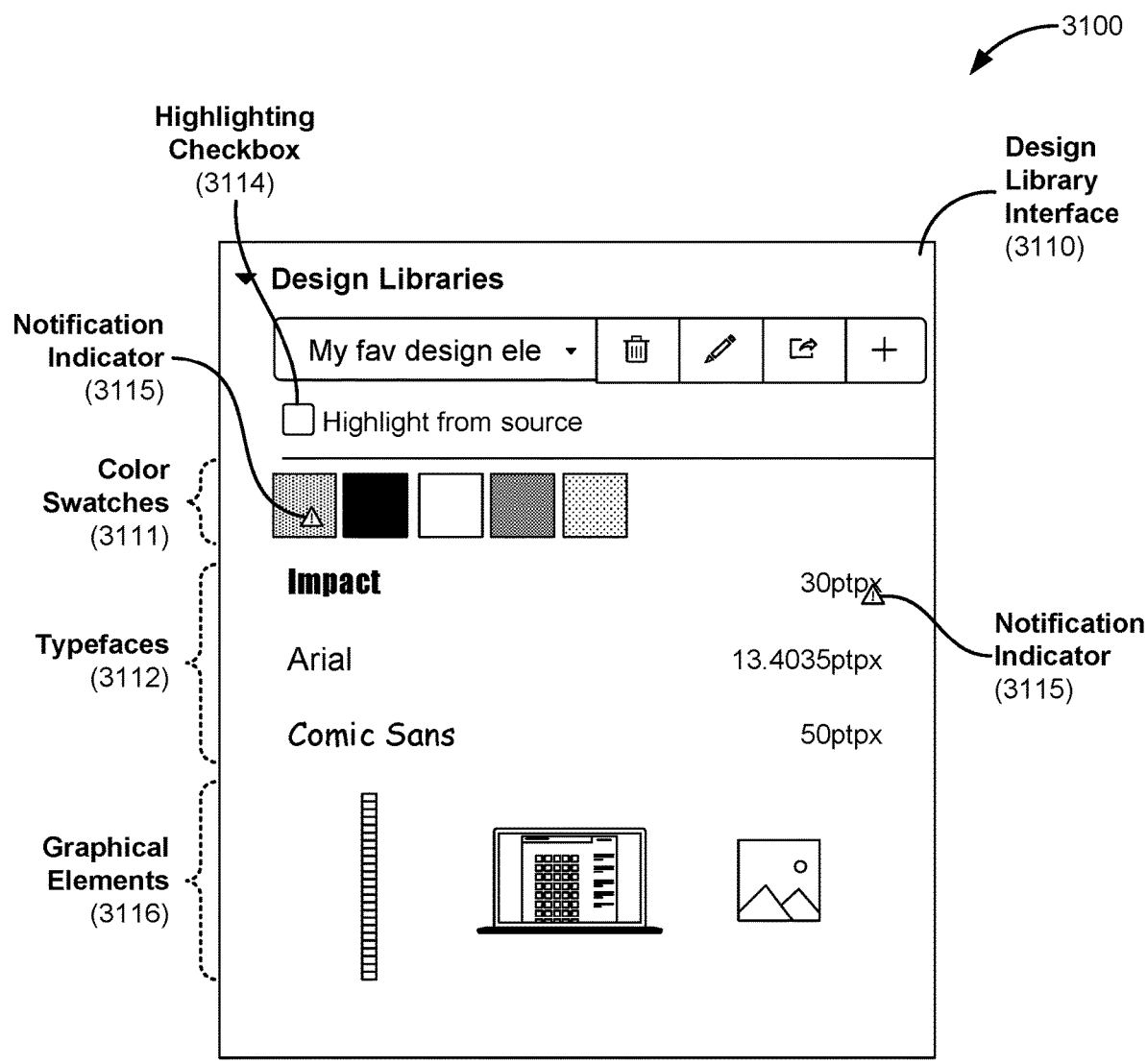
FIG. 3A is a screenshot illustrating an example design library interface generated by a design library interface module.

FIG. 3A is a screenshot 3100 illustrating an example design library interface 3110 generated by design library interface module 160. Design library interface 3110 displays a variety of curated design components 164, including a plurality of color swatches 3111, a plurality of typefaces 3112, and a plurality of graphical elements 3116. In one implementation, wherein design library interface module 160 forms part of digital asset manipulation application 170, the design components appearing in design library interface 3110 correspond to design components incorporated in a digital asset opened in digital asset manipulation application 170. In another implementation, wherein design library interface module 160 includes digital asset viewer 166, the design components appearing in design library interface 3110 correspond to design components incorporated in a digital asset displayed in digital asset viewer 166. In either case, design library interface 3110 optionally includes a highlighting checkbox 3114 that can be used to highlight curated design components that are incorporated in a displayed digital asset. Such highlighting can be provided in design library interface 3110 itself. On the other hand, selecting a curated design component can cause that design component to be highlighted in a displayed digital asset, including by displaying layer information associated with the selected design component. Design library interface 3110 also optionally includes a notification indicator 3115 that appears when an updated version of a curated design component may be available.

Figure 3B:
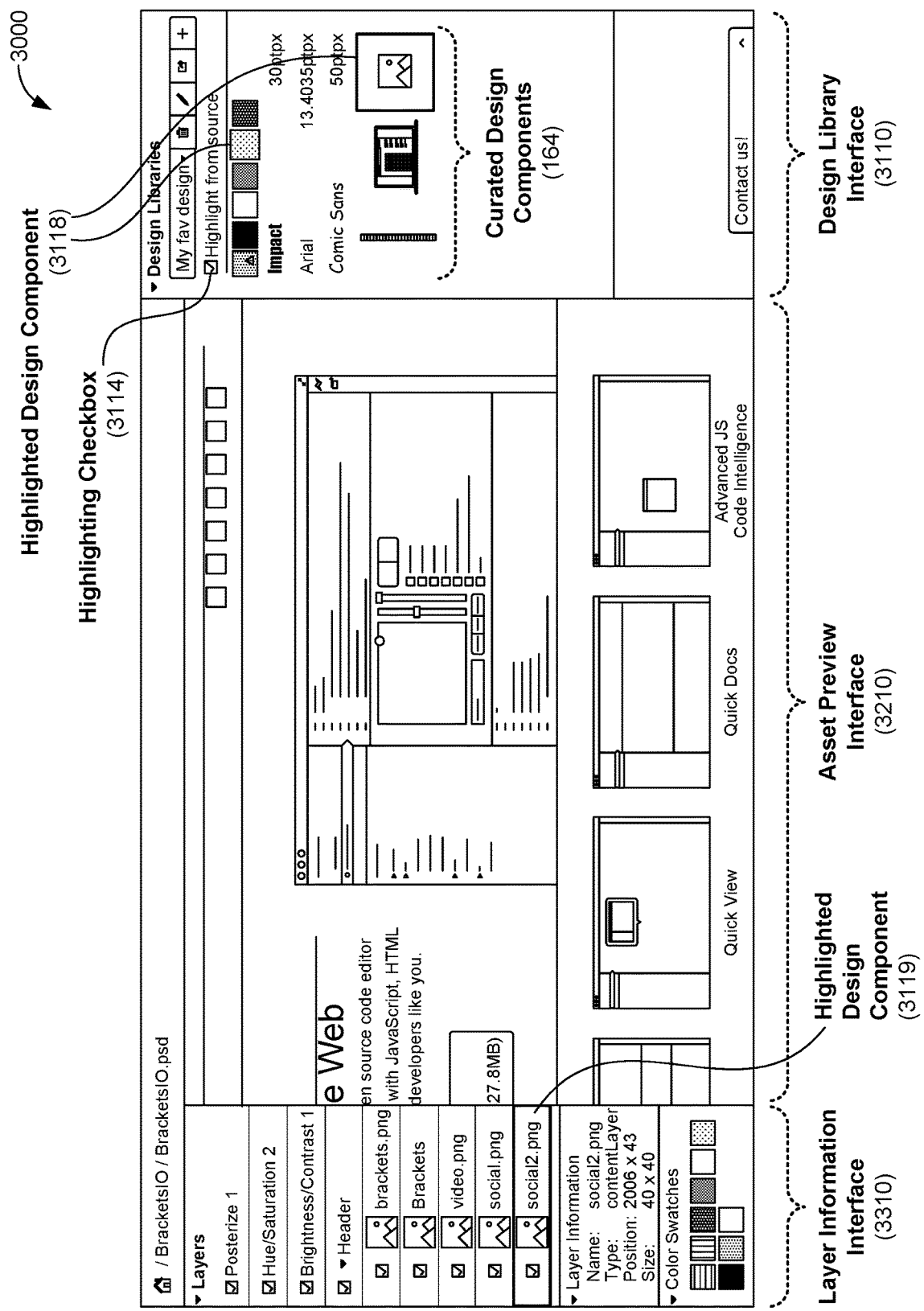
FIG. 3B is a screenshot illustrating an example design library interface that is displayed in conjunction with an asset preview interface.

FIG. 3B is a screenshot 3000 illustrating an example design library interface 3110 that is displayed in conjunction with an asset preview interface 3210. Asset preview interface 3210 displays a digital asset, such as a digital asset obtained from asset repository 210. Asset preview interface 3210 may be generated by, for example, digital asset viewer 166 and/or digital asset manipulation application 170. The displayed digital asset includes a plurality of design components, a subset of which are curated in design library 162, and thus appear in design library interface 3110. By selecting highlighting checkbox 3114, those curated design components that are incorporated into the displayed digital asset can be highlighted in design library interface 3110. See, for example, highlighted design components 3118 illustrated in FIG. 3B. Alternatively, by selecting one of curated design components 164, regardless of whether it has been previously highlighted or not, the selected design component can be highlighted in asset preview interface 3210. See, for example, highlighted design component 3119 in FIG. 3B. This allows a user to better understand how certain design components are deployed in a given digital asset. An optional layer information interface 3310 provides additional information about how a selected design component has been incorporated into the displayed digital asset.

Digital asset manipulation application 170 is a software application that is capable of creating, modifying, and otherwise manipulating digital assets. For example, digital asset manipulation application 170 can be used to extract design components from an existing digital asset and use the extracted components to generate a new digital asset. In such embodiments digital asset manipulation application 170 is configured to communicate with asset repository 210 via network 500. Digital asset manipulation application 170 may also optionally include an integrated design library interface module 160, as described herein. Examples of digital asset manipulation applications 170 include word processors, desktop publishers, graphical design applications, sound mixers, and the like. Digital asset manipulation application 170 optionally includes an asset preview interface 3210 such as that illustrated in FIG. 3B. In some implementations digital asset manipulation application 170 is executed locally at client computing device 100, while in other implementations it is remotely provisioned by means of code executed remotely at a server computer device (for example, PHP), or by code executed locally at a client computing device that is downloaded from a server computing device (for example, JavaScript). For example, in one embodiment application 170 is provided by a web service that services hypertext transfer protocol (HTTP) client requests. A remotely-provisioned module can be provided in real-time in response to a request from client computing device 100 for access to a server having resources that are of interest to a user. The server, if applicable, may be local to network 500 or may be remotely coupled to network 500 by one or more other networks or communication channels. In any such standalone or networked computing scenario, digital asset manipulation application 170 can be implemented using any suitable combination of interface technologies that allow a user to interact with client computing device 100.

Still referring to the example embodiment of networked computer system 2000 that is illustrated in FIG. 2, digital asset management server 200 comprises asset repository 210, a component tracking module 230, a version tracking module 240, a notification module 260, and an asset suggestion module 270. The particular components that comprise digital asset management server 200 may vary depending on the demands of a given application, and thus in other embodiments digital asset management server 200 may comprise additional, fewer, or alternative components as compared to those illustrated in FIG. 2. For example, in an alternative implementation asset repository 210 is instead provided as a standalone networked storage resource that is separate from digital asset management server 200.

Asset repository 210 comprises any suitable digital storage resource or combination of resources capable of storing a collection of digital assets 212. Each of the digital assets 212 may comprise one or more design components 214, which in turn may include corresponding component metadata 216. Asset repository 210 can be implemented using any suitable type of digital storage, such as a hard disk, a solid-state memory device, a redundant array of independent disks, or a distributed database system. The functionalities provided by client computing device 100 and digital asset management server 200 are independent of the particular configuration or implementation of asset repository 210.

Component metadata 216 may include a wide range of supplementary information characterizing one or more source digital assets from which a corresponding design component 214 originated. In some applications, for example where design component 214 is extracted from and incorporated into several different digital assets sequentially, component metadata 216 may characterize a plurality of linked digital assets 212. Component metadata 216 optionally complies with the XMP standard, and may include aspects such as an asset identifier that identifies a source digital asset from which the design component was extracted; a version identifier that identifies a version of the source digital asset; an author identifier that identifies an author of the source digital asset; and a layer identifier that can be used to reveal the context in which the design component was derived from the source asset. The layer identifier thus facilitates comparison with the particular layer that includes the derived asset, and therefore helps a user to determine whether or not a particular update impacts the component. Fewer, additional, or alternative types of component metadata can be used in other embodiments. One example JavaScript Object Notation (JSON) structure that stores component metadata 216 is provided here:

```
"source":{
    "layerId": 160,
    "id": "08f6c09e-ff34-4466-b7d8-84f493e15f3c",
    "name": "Portfolio.psd",
    "etag": "9d9f2b553f3b74f3b0dcebf198b06d37",
    "timestamp": "19881015144846"
},
```

Information characterizing a digital asset from which the design component was extracted can be stored as a "source" object. As can be seen, this source object includes a layer identifier ("layerId") that identifies the layer of the source asset from which the design component was extracted, an asset identifier ("id") that identifies the source digital asset, and a version identifier ("etag") that identifies a version of the source digital asset.

Component tracking module 230 provides information with respect to digital assets that incorporate a particular design component, and can be used to identify a source asset from which the particular design component was extracted. This is particularly useful when a user wishes to see how a particular design component has been deployed elsewhere. This is also useful where an author of a particular design component wishes to see what digital assets have incorporated his/her design component. Thus, in one example embodiment, upon receiving a query that identifies a particular design component, component tracking module 230 extracts a source asset identifier from the component metadata and retrieves the identified source asset from asset repository 210. Such a query can be submitted via design library interface 3110, for example by selecting one of the displayed curated design components 164. In some implementations the source asset can be displayed adjacent to design library interface 3110, as illustrated in FIG. 3B. This enables a user to easily see those assets that incorporate the queried design component, which is optionally highlighted within the displayed digital asset. See, for example, highlighted design component 3119 in FIG. 3B. In such embodiments highlighting functionality can be invoked using highlighting checkbox 3114.

Version tracking module 240 detects and responds to version disparities amongst digital assets 212 and design components 214 stored in asset repository 210. This can be accomplished by comparing the version identifier stored in the metadata of a design component that is stored in both design library 162 and in asset repository 100. As noted previously, in certain implementations design library 162 comprises a collection of curated design components 164. One or more of these curated design components 164 may comprise an older version of a design component stored in asset repository 210. This is particularly likely to occur when an asset is updated after it is initially shared amongst a team of collaborators. In such case version tracking module 240 is configured to detect the presence of such a discrepancy and, in conjunction with functionality provided by notification module 260, send a notification of the discrepancy to a user of client computing device 100. This notification can take the form of notification indicator 3115 displayed in design library interface 3110, as illustrated in FIG. 3A. Thus, when a user sees notification indicator 3115, he/she can select the indicated design component and view the most recent version of the source asset, which contains the most recent version of the design component. In implementations where layer information stored in component metadata 216, such information makes it easy to compare the particular layer that includes the derived asset, and therefore helps a user to determine whether or not a particular update impacts the component.

Still referring to the example embodiment illustrated in FIG. 2, asset suggestion module 270 allows asset usage patterns to be detected, inferred, or otherwise analyzed. Such patterns can be derived from component metadata 216 stored in asset repository 210. For example, when multiple assets leverage a common design component, a commonality amongst those multiple assets can be inferred. This allows similarly themed assets to be collected, which in turn makes it possible to recommend particular content items to a user. Asset suggestion module 270 facilitates the process of identifying digital assets which may be relevant to a particular project, thus making it easier for users to become inspired and express their creativity. Asset suggestion module 270 optionally provides a user interface through which queries can be submitted and information about digital assets 212 can be revealed. Operations such as these can not only be used to identify potentially related content items, but can also be used to evaluate where a particular author's design components have been deployed, subject to the author's authorization to view such related content items. In alternative embodiments such functionality is instead provided by other application-specific modules that form part of digital asset management server 200, such as component tracking module 230 and/or version tracking module 240.

Client computing device 100 and digital asset management server 200 can communicate with each other via network 500. Network 500 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 500 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the digital asset and design component tracking methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, such as digital image editing software applications, word processing applications, desktop publishing applications, presentation applications, file management systems, and content management systems. For example, a digital image editing software application can be configured to display a design library interface in conjunction with a manipulated digital asset, and thus can be configured to implement certain of the functionalities disclosed herein. The computer software applications disclosed herein may include any number of different modules, sub-modules, or other components of distinct functionality, and can provide information to, or receive information from, still other components and services. These modules can be used, for example, to communicate with peripheral hardware components, networked storage resources, or other external components. More generally, other components and functionalities not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology

FIG. 4 is a flowchart illustrating an example method 4000 for curating design components in a design library. FIG. 5 is a flowchart illustrating an example method 5000 for viewing digital assets that incorporate a selected design component. FIG. 6 is a flowchart illustrating an example method 6000 for identifying design components that form part of a displayed digital asset. As can be seen, these methods each include a number of phases and sub-processes, the sequence of which may vary from one embodiment to another. However, when considered in the aggregate, these phases and sub-processes form a complete digital asset and design component tracking technique that is responsive to user input in accordance with certain of the embodiments disclosed herein. These methods can be implemented, for example, using the system architecture illustrated in FIG. 2 and described herein. However, other system architectures can be used in other embodiments, as will be apparent in light of this disclosure. To this end, the correlation of the various functionalities illustrated in FIGS. 4, 5, and 6 is not intended to imply any structural and/or use limitations. Rather, other embodiments may include, for example, varying degrees of integration wherein multiple functionalities are effectively performed by one system or module. For example, in an alternative embodiment a single module is used to perform component and version tracking functionality. Thus other embodiments may have fewer or more modules depending on the granularity of implementation. Numerous variations and alternative configurations will be apparent in light of this disclosure.

As illustrated in FIG. 4, the design component curation method 4000 can be understood as commencing with a user extracting a design component 214 from a source asset 212s. See reference numeral 4100 in FIG. 4. Such extraction may occur, for example, using a drag-and-drop operation that involves dragging design component 214 from the displayed source asset 212s to design library interface 3110. Source asset 212s may be displayed using digital asset manipulation application 170, digital asset viewer 166, or any other suitable application capable of displaying digital assets. In some implementations the application used to display source asset 212s is also used to extract design component 214 (for example, digital asset manipulation application 170 or digital asset viewer 166), while in other embodiments digital asset management server 200 is configured to extract design component 214 from source asset 212s.

When design component 214 is extracted from source asset 212s, design library interface module 160 can be configured to generate component metadata 216 for the extracted design component 214. See reference numeral 4200 in FIG. 4. In one implementation, component metadata 216 comprises an asset identifier 216a that identifies a source digital asset from which the design component was extracted; a version identifier 216b that identifies a version of the source digital asset; an author identifier 216c that identifies an author of the source digital asset; and a layer identifier 216d that can be used to reveal the context in which the design component was derived from the source asset. Fewer, additional, or alternative types of component metadata 216 can be generated in other embodiments. In some implementations design library interface module 160 is used to generate component metadata 216, while in other embodiments another component, such as digital asset management server 200, is configured to generate component metadata 216.

Design library interface module 160 curates the extracted design component 214 and its corresponding metadata 216 into design library 162. See reference numeral 4300 in FIG. 4. Curated design components can then be displayed in design library interface 3110. See reference numeral 4400. A user can thus collect frequently used design components, such as components that relate to a given project, and organize them using design library interface 3110. In certain embodiments a collection of design components can be shared amongst colleagues working in a collaborative environment. Each curated design component can be understood as existing independently of the source asset from which it was extracted, even though the underlying component metadata 216 preserves this source information. In certain embodiments curated design components are stored locally at client computing device 100. In alternative embodiments curated design components are stored remotely at digital asset management server 200, for example in a directory or other virtual container associated with the user who curated the components.

Once design component 214 has been extracted from source asset 212s and curated in design library 162, version tracking module 240 can be configured to monitor asset repository 210 for updates to source asset 212s as identified by component metadata 216. See reference numeral 4500 in FIG. 4. In certain embodiments such monitoring comprises comparing a source asset version saved in asset repository 210 with a source asset version defined by version identifier 216b associated with the curated design component 214. If asset repository 210 contains a more recent version of source asset 212s than that identified by version identifier 216b, then the curated design component 214 can be considered to have been superseded by a more recent version saved in asset repository 210. In this context, determining the "more recent" version of an asset is accomplished through the use of a timestamp that forms part of component metadata 216. In embodiments wherein source asset 212s is stored in a compositional fashion, such as in the case of a webpage that includes multiple image files, the monitoring additionally or alternatively includes a comparison of layer identifier 216d. In either case, monitoring is performed on an ongoing basis, and is implemented, for example, as a background process.

In an alternative implementation such monitoring is performed whenever an asset is saved in asset repository 210.

If a discrepancy between the two instances of source asset 212s is detected, notification module 260 can be configured to generate an update notification indicator 3115 that can be displayed in design library interface 3110. See reference numeral 4550 in FIG. 4. This alerts a user to the fact that a curated design component is potentially outdated, at which point the user can view the source asset, as will be described in turn. If the user wishes to curate the more recent version in design library 162, the user may replace the outdated version with the updated version. In an embodiment wherein digital asset management server 200 includes an asset browser that can be used to view filtered lists of stored assets, the asset browser can be configured to filter assets that have been updated since a last access time.

As illustrated in FIG. 5, digital asset viewing method 5000 can be understood as commencing at a state where design library interface module 160 displays one or more curated design components 164 in design library interface 3110. See reference numeral 5100 in FIG. 5. Examples of such a display are provided in FIGS. 3A and 3B. While in such a state, design library interface module 160 is configured to receive a user selection of one of the curated design components 164. See reference numeral 5200 in FIG. 5. Such a selection may consist of the user clicking, double-clicking, secondary-clicking (for example, right-clicking), tapping, gesturing, hovering over, or otherwise indicating one of curated design components 164 that is displayed in design library interface 3110. In an alternative implementation the user's selection is received via voice command. Regardless of how it is received, design library interface module 160 can be configured to respond to such a selection by presenting the user with a list of available command options, one example of which is a view source command. Design library interface module 160 is configured to receive a user selection of the view source command. See reference numeral 5300 in FIG. 5.

In response to receiving the view source command, component tracking module 230 is configured to identify one or more source assets that incorporate the curated design component selected by the user, also referred to as "the selected design component". See reference numeral 5400 in FIG. 5. This can be accomplished by reading a source identifier from component metadata associated with the selected design component, and identifying a digital asset corresponding to the extracted source identifier. The identified asset can then be transmitted from asset repository 210 to client computing device 100, where it can be displayed using, for example, digital asset viewer 166. See reference numeral 5500 in FIG. 5. In an alternative embodiment, digital asset manipulation application 170 is configured to display the identified asset. In some cases the identified asset may be complex, and may comprise a large quantity of design components. Simply displaying the digital asset may not clearly reveal how the selected design component is used in the source digital asset. Because of this, component tracking module 230 is optionally configured to further identify a source asset layer that incorporates the selected design component. See reference numeral 5450 in FIG. 5. This can be accomplished by reading a layer identifier from component metadata associated with the selected design component. Once the appropriate layer has been identified, digital asset viewer 166 or digital asset manipulation application 170 can optionally further display layer information associated with the selected design component. See reference numeral 5550 in FIG. 5. This makes it easier to a user to understand how the selected design component is used within the context of a complex digital asset.

As illustrated in FIG. 6, design component identification method 6000 can be understood as commencing at a state where (a) design library interface module 160 displays one or more curated design components 164 in design library interface 3110, and (b) digital asset viewer 166 displays a digital asset. See reference numerals 6100a and 6100b in FIG. 6. In an alternative embodiment, digital asset manipulation application 170 is configured to display the digital asset. Design library interface module 160 is configured to detect selection of highlighting checkbox 3114. See reference numeral 6200 in FIG. 6. In response to such a selection, design library interface module 160 can be configured to identify which of the curated design components 164 are incorporated in the displayed digital asset. See reference numeral 6300 in FIG. 6. This can be accomplished by determining the asset identifier of the displayed digital asset and then determining which of the curated design components, if any, have that source identifier included in their component metadata. Design components that include the asset identifier associated with the displayed digital asset can be understood as having been incorporated within the displayed digital asset. Design library interface module 160 can thus be configured to highlight or otherwise indicate those curated design components which are incorporated in the displayed digital asset. See reference numeral 6400 in FIG. 6. This allows a user to easily understand which design components are being used by a given digital asset. Such highlighting can be cancelled by unchecking highlighting checkbox 3114.

Further Example Embodiments

Numerous variations and configurations will be apparent in light of this disclosure. For instance, one example embodiment provides a computer-implemented method for tracking a digital asset in a collaborative work environment, the method comprising receiving a user selection that identifies a design component that forms part of a digital asset that is stored in an asset repository. The digital asset has an initial version. The method further comprises generating component metadata for the design component. The component metadata identifies the digital asset and the initial version of the digital asset. The method further comprises storing the design component and the component metadata in a design library. The method further comprises displaying the design component in a design library interface. The method further comprises, in response to a determination that the initial version of the digital asset that is identified in the component metadata is different from a current version of the digital asset stored in the asset repository, displaying a notification in the design library interface. In some cases the method further comprises extracting the design component from the initial version of the digital asset. In some cases the component metadata further comprises an author identifier that identifies an author of the digital asset. In some cases (a) the design component is selected from a group consisting of a typeface, a color swatch, and a graphical element; and (b) the digital asset is selected from a group consisting of a style sheet, a webpage, and a document. In some cases the component metadata complies with the XMP standard. In some cases the method further comprises monitoring the asset repository for changes to the initial version of the digital asset that is identified in the component metadata. In some cases the notification comprises a graphical indicator displayed adjacent to the design component in the design library interface. In some cases the method further comprises, in response to a second user selection of the design component from the design library interface, displaying the digital asset in an asset preview interface that is positioned adjacent to the design library interface. In some cases (a) the method further comprises displaying the digital asset in an asset preview interface before receiving the user selection; and (b) wherein the user selection comprises a drag-and-drop operation from the asset preview interface to the design library interface.

Another example embodiment provides a digital asset tracking system that comprises a storage device. The system further comprises a processor operatively coupled to the storage device, the processor configured to execute instructions stored in the storage device that, when executed, cause the processor to carry out a digital asset tracking process. The digital asset tracking process comprises curating a plurality of design components in a design library. Each of the curated design components includes component metadata that identifies a source asset that includes the corresponding design component. The digital asset tracking process further comprises displaying the curated design components in a design library interface. The digital asset tracking process further comprises, in response to a user selection of a particular design component from the design library interface, identifying a particular source asset that includes the particular design component. The digital asset tracking process further comprises displaying the particular source asset in a digital asset viewer. In some cases the curated design components displayed in the design library interface are (a) displayed as having been extracted from a corresponding source asset, and (b) collectively included in more than one source asset. In some cases (a) the digital asset tracking process further comprises a networked asset repository; and (b) the particular source asset is identified by matching an asset identifier in the component metadata included in the particular design component with an asset identifier of an asset stored in the networked asset repository. In some cases the digital asset tracking process further comprises highlighting the particular design component in the particular source asset that is displayed in the digital asset viewer. In some cases the digital asset tracking process further comprises (a) detecting a modification to the source asset; and (b) in response to detecting the modification, displaying a notification in the design library interface adjacent to a curated design component that forms part of the source asset. In some cases (a) the design library interface includes a highlighting checkbox; and (b) the digital asset tracking process further comprises highlighting, in response to selection of the highlighting checkbox, one or more of the curated design components, wherein the highlighted design components form a part of the particular source asset that is displayed in the digital asset viewer. In some cases the system further comprises a networked asset repository, wherein the source asset is saved in the networked asset repository. In some cases the plurality of design components are curated based on design components included in a collection of one or more digital assets that have been accessed using a digital asset manipulation application.

Another example embodiment provides a computer program product encoded with instructions that, when executed by one or more processors, causes a digital asset tracking process to be carried out. The digital asset tracking process comprises receiving a user selection that identifies a design component that forms part of a digital asset that is stored in an asset repository. The digital asset has an initial version. The process further comprises generating component metadata for the design component. The component metadata identifies the digital asset and the initial version of the digital asset. The process further comprises storing the design component and the component metadata in a design library. The process further comprises displaying the design component in a design library interface. The process further comprises, in response to a determination that the initial version of the digital asset that is identified in the component metadata is different from a current version of the digital asset stored in the asset repository, displaying a notification in the design library interface. In some cases the digital asset tracking process further comprises opening the digital asset in a digital asset manipulation application before receiving the user selection. In some cases the digital asset tracking process further comprises comparing the current version of the digital asset stored in the asset repository with the initial version of the digital asset identified in the component metadata.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be defined not by this detailed description, but rather by the claims appended hereto.

What is claimed is:

1. A computer-implemented method, the method comprising:
    creating a first digital asset using a first version of a first design component extracted from a second digital asset;
    causing display of the first design component in a design library interface, the design library interface displaying the first version of the first design component extracted from the second digital asset;
    based on a layer identifier that identifies a layer of the second digital asset from which the first design component was extracted included in component metadata for the first design component, identifying a second version of the first design component that is created within the second digital asset; and
    in response to a determination that the second version of the first design component is different from the first version of the first design component, causing display of a notification in the design library interface, the notification including an alert indicating the first version of the first design component is outdated relative to the second version of first design component.

2. The method of claim 1, further comprising extracting the first design component from the second version of the second digital asset.

3. The method of claim 1, wherein the layer identifier is configured to facilitate a determination of whether an update of the second digital asset impacts the first design component extracted from the layer.

4. The method of claim 1, wherein the first design component is selected from a group consisting of a typeface, a color swatch, and a graphical element; and the first digital asset is selected from a group consisting of a style sheet, a webpage, and a document.

5. The method of claim 1, wherein the component metadata complies with an Extensible Metadata Platform (XMP) standard.

6. The method of claim 1, further comprising monitoring an asset repository for changes to the first digital asset that is identified in the component metadata.

7. The method of claim 1, wherein the notification comprises a graphical indicator displayed adjacent to the first design component in the design library interface, the graphical indicator to indicate the first design component being potentially outdated.

8. The method of claim 1, further comprising, in response to a second user selection of the first design component from the design library interface, displaying the second digital asset in an asset preview interface with a plurality of design components, the asset preview interface being positioned adjacent to the design library interface.

9. The method of claim 1, further comprising displaying the first digital asset in an asset preview interface before receiving a user selection, wherein the user selection comprises a drag-and-drop operation from the asset preview interface to the design library interface.

10. A system, comprising:
a storage device; and
a processor operatively coupled to the storage device, the processor configured to execute instructions stored in the storage device that, when executed, cause the processor to carry out a process comprising:
curating a plurality of design components from different source assets, a first design component, of the plurality of design components, being a sub- component of one or more of the source assets, wherein the first design component includes at least one of a typeface, a color swatch, and a graphical element, and the source assets include at least one of a style sheet, a webpage, and a document;
causing display of a portion of the plurality of design components in a design library interface;
in response to a user selection of the first design component, identifying a particular source asset where the first design component is curated from; and
in response to the identifying of the particular source asset, causing display of a first version of the particular source asset such that there is simultaneous display of both (a) the first version of the particular source asset and (b) the first design component.

11. The system of claim 10, wherein the process further comprises in response to the user selection of the particular design component from the design library interface, further identifying context in which the particular design component was derived from the particular source asset, wherein the context comprises a layer of the particular source asset that includes the particular design component.

12. The system of claim 10, wherein the digital asset tracking system further comprises a networked asset repository; and the particular source asset is identified by matching an asset identifier in component metadata included in the particular design component with an asset identifier of an asset stored in the networked asset repository.

13. The system of claim 10, wherein the process further comprises highlighting the particular design component in the particular source asset that is displayed in a digital asset viewer.

14. The system of claim 10, wherein the process further comprises detecting a modification to the particular source asset; and in response to detecting the modification, displaying a notification in the design library interface adjacent to the particular design component that forms part of the particular source asset.

15. The system of claim 10, wherein the design library interface includes a highlighting checkbox; and the process further comprises highlighting, in response to selection of the highlighting checkbox, one or more of the plurality of design components, wherein the one or more of the plurality of design components form a part of the particular source asset that is displayed in a digital asset viewer.

16. The system of claim 10, further comprising:
a networked asset repository, wherein the particular source asset is stored in the networked asset repository.

17. The system of claim 10, wherein the plurality of design components are curated based on design components included in a collection of one or more digital assets that have been accessed using a digital asset manipulation application.

18. A non-transitory computer program product encoded with instructions that, when executed by one or more processors, causes a digital asset tracking process to be carried out, the digital asset tracking process comprising:
creating, via designer input, a first digital asset using a first version of a first design component, the first version of the first design component being extracted from a second digital asset;
causing display of the first design component in a design library interface, the design library interface displaying the first version of the first design component extracted from the second digital asset; and
based on a layer identifier that identifies a layer of the second digital asset from which the first design component was extracted included in component metadata for the first design component, causing display of a notification in the design library interface, the notification indicating the first version of the first design component is outdated relative to a second version of first design component included in the second digital asset.

19. The computer program product of claim 18, wherein the digital asset tracking process further comprises opening the second digital asset in a digital asset manipulation application before receiving a user selection.

20. The computer program product of claim 18, wherein the digital asset tracking process further comprises comparing the first version of the second digital asset stored in an asset repository with the second version of the second digital asset identified in the component metadata.

* * * * *